United States Patent [19]

Nupnau

[11] 4,009,949
[45] Mar. 1, 1977

[54] THREADING AND SYNCHRONIZATION SYSTEM FOR SOUND MOTION PICTURE PROJECTOR

[75] Inventor: Arthur E. Nupnau, Chicago, Ill.

[73] Assignee: Bell & Howell Company, Chicago, Ill.

[22] Filed: Oct. 30, 1975

[21] Appl. No.: 627,320

Related U.S. Application Data

[63] Continuation of Ser. No. 518,328, Oct. 29, 1974, abandoned.

[52] U.S. Cl. .................................. 352/159; 352/27
[51] Int. Cl.² ........................................ G03B 1/56
[58] Field of Search ............. 352/157, 158, 159, 27

[56] References Cited
UNITED STATES PATENTS

| | | | |
|---|---|---|---|
| 2,703,034 | 3/1955 | Thomas | 352/158 |
| 3,134,294 | 5/1964 | Kaden | 352/159 |
| 3,137,200 | 6/1964 | Michaels | 352/158 |
| 3,233,958 | 2/1966 | Kaess | 352/158 |
| 3,743,398 | 7/1973 | Johnson | 352/157 |

*Primary Examiner*—Monroe H. Hayes
*Attorney, Agent, or Firm*—John E. Peele, Jr.; Roger M. Fitz-Gerald; Gerald B. Epstein

[57] ABSTRACT

For a sound motion picture projector, an automatic threading and image-sound synchronization system is provided without added moving components. During threading the system establishes for image-sound synchronization the correct image-to-sound spacing of a film having the sound longitudinally spaced along the film from the related image.

3 Claims, 3 Drawing Figures

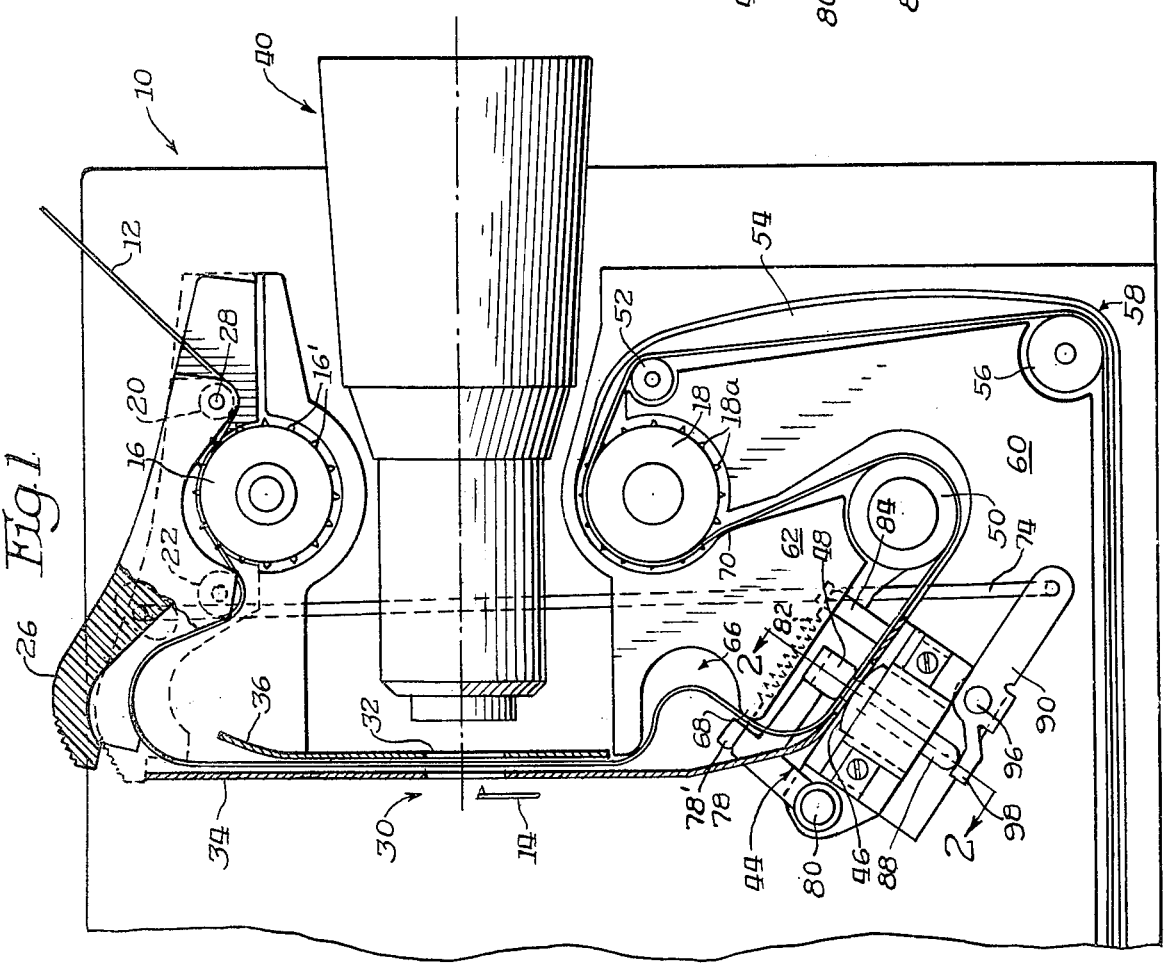

THREADING AND SYNCHRONIZATION SYSTEM FOR SOUND MOTION PICTURE PROJECTOR

This is a continuation of application Ser. No. 518,328 filed Oct. 29, 1974, now abandoned.

This invention relates generally to a motion picture projector and particularly to a sound motion picture projector which is capable of automatically threading motion picture film with an accompanying sound track, and thereafter projecting the film with the image and sound synchronized.

Motion picture projectors capable of reproducing sound from and/or recording sound on a sound track on motion picture film have been available since the early 1930's. Generally, projectors of this class have been intended for use by skilled operators such as audio-visual specialists and advanced amateurs. Recently, motion picture cameras have become available to the general public requiring little skill to operate and record sound simultaneously with the recording of motion picture images. With such as easy to use camera, it is desirable to provide a similarly easy to use motion picture projector to reproduce the sound synchronized with the pictures. In the recent past, motion picture projectors provided with means for automatically threading the film through the projection station and the sound station have been manufactured. However, due to synchronization requirements, these projectors have been more complex and have been more difficult to manufacture than comparable silent projectors. Thus, these projectors were significantly more expensive than the additional cost required by the sound system. Also, these projectors were often more difficult to operate in that additional controls were required to insure proper threading and operation of the projector.

The motion picture projector according to the present invention provides a simple, easy to operate, easy to manufacture, and sturdy mechanism subject to extended periods of use without adjustments or modifications. In addition to the required movable components for threading of film into and through a sound station in a motion picture projector, the projector according to this invention has no moving parts to maintain sound picture synchronization. Generally, synchronization of the sound and picture has been accomplished by several intermediate moving components which maintain the film between the sound station and the projection station at a constant length varied only as required to provide a constant linear film transport through the sound station while the film is moved intermittently at the projection station. Due to slippage which occurs at the sound station, variable speed mechanisms and/or motor control devices have been introduced to move the film through the projection station at variable speeds while the film is moved through the sound station at a constant speed. Since variations in the speed of film movement pass a sound station cause pitch changes in the audio output, which changes although slight can be detected by the audience, the film is moved through the sound station at a precisely metered rate. To compensate for stretching, shrinking, and slippage of film, the rate at which the film is moved by the intermittent through the projection station is varied slightly as required. In most instances, the slight variation in the action occuring cannot be visually detected.

According to the present invention, a sound motion picture projector having a sprocket film drive is designed to automatically thread film from an input area through a projection station, a sound station, and toward a take-up area. A sprocket transports film from the supply to the projection station. Intermediate the projection station and the sound station, a loop accumulator is provided along the film path. Beyond the sound station along the film path, a second or trailing sprocket is arranged to engage the film to accurately meter the quantity of film moving from the sound station. The rate of withdrawal of film from the sound station is precisely the same rate at which film is moved to the projection station by the upper sprocket. By virtue of the synchronized sprocket drives, sound and image synchronization is maintained between the sound station and the projection station when the projector is in the normal operating mode. For purposes of threading, the film is guided along a substantially enclosed path which is dimensioned between the projection station and the trailing sprocket to provide a precise length of film to obtain the required image frame-to-sound separation. During the threading operation, the sound head and a pressure pad are maintained separated for ease of movement of film therebetween. However, after threading, when the projector is arranged for the projection mode, relative movement together of the sound head and the pressure pad cause the film to be engaged frictionally and restrained against free movement. This restraint causes a length of film to form a loop in the accumulator between the sound station and the projection station. An isolator member and the accumulator together preclude transmitting the effect of the intermittent mechanism to the sound station. Also, the prevent the capstan beyond the sound station from applying torque on the film at the projection station to cause pulling of the film through the station inadvertently. By this combination of components, a unique arrangement of a threading and image sound synchronization system without moving components is provided for a sound motion picture projector.

An object of the invention is to provide for a sound motion picture projector an automatic threading and image-sound synchronization system without added moving components.

Another object is to provide for a sound motion picture projector an automatic image-sound synchronization system using a fixed loop accumulator and existing projection station and sound station components to establish image frame-to-sound synchronization.

The above and other objects will become apparent from the description when read in connection with the accompanying drawings in which like parts are designated by like numerals.

IN THE DRAWINGS

FIG. 1 is an elevational view of a motion picture projector capable of handling a sound film according to the invention, with parts removed and parts broken away to more clearly illustrate the invention;

FIG. 2 is a cross-sectional view taken on line 2—2 of FIG. 1; and

FIG. 3 is a view of the sound station of the projector according to the invention during the film threading mode.

Referring now to FIG. 1 only portions of a motion picture projector 10 which are considered necessary for an understanding of the invention are shown. The projector is provided with not shown mechanisms to cause actuation in at least a film threading mode and a projection mode. A film 12, supplied from a not shown reel or cartridge is a known sound motion picture film having a sound track formed along at least one longitudinal edge thereof adjacent a row of image frames. The sound for a particular frame is displaced longitudinally along the film to enable image-sound synchronization by spaced reproducers. In this embodiment in a Super 8 magnetic sound projector, the image is separated from the sound on a magnetic stripe by three inches or 76.2 millimeters.

The film 12 is provided with perforations arranged along a longitudinal edge for transport of the film in a known manner by an intermittently operated shuttle 14 and continuously operated sprockets 16, 18. The film is transported from the supply along a film path passing about a pair of guide rollers 20, 22 adjacent a leading sprocket 16. After the film is seated on the teeth 16' of sprocket 16, the sprocket transports the film to the vicinity of a loop former 26 mounted for pivotal movement about an axis 28 coaxial with guide roller 20. The loop former guides the film into a projection station 30 including an aperture 32 formed in a film guide member 34 and a pressure plate 36, which cooperate to releasably restrain the film for projection during intermittent movement through the station. Further, the projection station includes projection optics typically shown as lens 40 and a not shown projection lamp from which light rays pass through the film to project the image of an aligned film frame onto a viewing surface. Also located proximate the projection station is the schematically shown shuttle 14, which intermittently engages in perforations of the film to transport same from the projection station.

From the projection station 30, the film path guides the film to a sound station 44. The sound station includes a gate defined by a transducer 46, shown as a magnetic record-reproduce head, opposite which a pressure pad 48 is arranged. The gate is openable and closeable for respective threading of the film between the relatively movable head and pressure pad, and for maintaining the magnetic track on the film in intimate contact with the head during a projection sequence. Associated with the sound station is a capstan 50 mounted on a not shown shaft supported by bearings in the mechanism support plate. Internally of the projector, a flywheel (not shown) is fixed to the shaft to smooth the rotation of the capstan. The inertia of the flywheel, once rotatings cause continuous feeding of film past the transducer, after film movement is initiated. Although the capstan will continue to rotate when the projector is deactivated, the film loop about the capstan is quickly loosened by the excessive film length being generated thereabout when the trailing sprocket 18 stops. Hence, no damage to the film can occur.

Beyond the sound station 44, the projector has a trailing sprocket 18 to which the film is guided from the sound station. The sprocket is driven in synchronism with the upper leading sprocket 16 to maintain a fixed length of film in the path between the sprockets. As seen in FIGS. 1 and 3, the film path is essentially a closed track along which the film can move for threading and can be moved during a projection sequence. The track has a lower portion defined as a generally exterior portion against which the film is guided during most of a threading sequence; and an upper portion defined as a generally interior portion 60 which restricts the film to movement in the path. As the film is threaded through the path into the vicinity of the trailing sprocket, the path becomes narrowed about the sprocket to ensure seating of the perforations of the film onto the teeth 18a of the trailing sprocket. Since several teeth always engage the film, one or two broken perforations in the film are inadequate to permit the film to slip relative to the sprocket. Hence, between the sprockets, a continuous metered or controlled film feed is maintained by the sprockets during the transporting of a length of film.

From the trailing sprocket 18, the film 12 is guided about a free roller 52 into a channel 54 and toward the take-up area. Another free roller 56 is arranged at a bend 58 in the latter part of the path to reduce friction and possible film damage when the film is tensioned by the take-up. The guide path is configured with a surface including film guide member 34 against which the leading end of the film rides smoothly when being pushed along during the threading sequence. In the preferred embodiment, portions of this guide path are formed by surfaces of a lower guide block 60.

As shown in FIG. 3, threading of the film is a continuous operation with the film being guided along the guide path including the above described portion. In this preferred embodiment, an internal guide member 62 is a shaped block intermediate the projection station 30, the sound station 44, and the trailing sprocket 18. Proximate the projection station, the surface of the block is configured with an essentially semi-circular throat or loop forming recess 66. At the sound station end of the throat, the block is rounded to define an isolator portion 68 against which the film can engage during passage into the sound station. This isolator portion serves to smooth the pulsations of the film caused by the intermittent action of the shuttle 14 and to isolate these film movements from the sound station.

Other portions of the internal guide track formed by the block 62 solely define an opposing track portion except for a ramp area 70 slightly ahead of the trailing sprocket 18. As the film is guided by the external track portion 60 into the vicinity of the trailing sprocket (as suggested in FIG. 3), the leading end of the film crosses from engagement with the external track portion to engagement with the internal track portion at the ramp position. During threading, the ramp directs the film chordally onto the sprocket, and ensures the threading of the film onto the teeth of the sprocket. Further, during the projection sequence, the ramp functions as an isolator to isolate the pulsations of the sprocket from feedback to the sound station, where smooth constant transport is desired.

During threading, the sound station 44 is open permitting free movement of film between the gate defined by the transducer head 46 and the pressure pad 48. The movable component is displaced by a rod-like link member 74 as the upper loop former 26 is moved from a loop forming orientation, shown in dotted lines in FIG. 1, to a projection mode orientation, shown in solid lines. The link member couples the loop former and the gate for simultaneous actuation between threading and operating conditions. In this embodiment, the pressure pad 48 is displaced responsive to actuation of the link 74. To correlate the link-pad actuation, the pressure pad is supported on a carrier 78 which is mounted for pivotal movement about an axis 80. To urge the pad against the transducer head 46, a coiled spring 82 is connected between an arm 78' extending from the carrier and a substantially aligned post 84 fixed to a stationary frame or mechanism plate portion. Lifting of the pad away from the head is accomplished through the loop former coupling link member 74 which actuates a displacing member 88 by pivoting a pusher member 90. The displacing member is longitudinally movable in an elongated cavity 86 formed in a frame portion between guiding surfaces which generally guide the member for smooth sliding movement. An extension 92 on the displacing member 88 rides along a groove 94 in the frame to assist in maintaining alignment of the member. The pusher member 90 is mounted on an axle 96 for pivotal movement through a small angle when actuated by the coupling link which is connected to an end of the member. Opposite the pivot axis from the link connection, there is arranged integral therewith a displacing member engaging portion 98. During the threading mode, the loop former 26 and the link 74 are actuated to displace the link downwardly. This movement of the link pivots the pusher member 90 to lift the displacing member 88 and therefore lift the pressure pad from transducer engagement in the manner as shown in FIG. 3. Thereafter, during the projection sequence, release of the loop former permits the spring 82 to urge the pressure pad 46 to hold the film frictionally against the transducer head 48. The portion of the carrier adjacent the head moves the displacement member to the extent enabled by the pusher member 90.

Operation of the projector is initiated by closing the loop former 26, and introducing the leading end of the film 12 into the film path. As the teeth of the leading sprocket 16 engage the perforations in the film, the film is transported toward the shuttle 14. After the shuttle engages the film, the film is moved intermittently along the path toward the sound station. As shown in FIG. 3, the film path guides the film across the throat area, between the transducer 46 and the pressure pad 48, and loosely about the capstan 50, toward the trailing sprocket 18. Following engagement of the teeth of the trailing sprocket in film perforations, the film is transported further toward the take-up area. With the projector in the threading mode, a predetermined length of film is located between the leading sprocket and the trailing sprocket.

As the threaded projector is changed to the projection mode, the length of film between the leading sprocket 16 and the trailing sprocket 18 is unchanged due to positive restraint by the sprocket teeth in the film perforations. However, due to closing of the gate and the frictional drag applied thereby to the film, the lengths of the film before and after the gate are altered. Beyond the gate, the film length is shortened since the gate restrains film movement while the trailing sprocket continues to move film from the area. As this film length is reduced, the film is pulled taut against the periphery of the capstan 50 as well as the ramp 70 of the interior track portion. Movement of the film initiates rotation of the capstan and the flywheel fixed therewith.

Ahead of the gate in the sound station 44, the length of film is slightly increased since the gate restrains the film against the free movement necessary to balance the lengths before and after the gate. The excess length of film before the gate causes the film to buckle slightly into the throat 66, and to establish the correct frame-to-sound length for image-sound synchronization.

During a projection sequence, as film is held in the projection station by the shuttle, the length of film in the intermediate area between that station and the gate is reduced slightly as the film is pulled through the sound station with a continuous motion. However, as the shuttle transports a length of film before being retracted and inserted into the next perforations, the shuttle drives a length of film comparable to one frame into the intermediate area again establishing full dimension of the small buckle or loop in the throat. Because of the pressure between the pressure pad and the magnetic head, as well as the isolator 68, the uneven feed of the film into the intermediate area is not transmitted to the sound station. The film is removed from beyond the gate by the constant rotation by the inertia of the attached flywheel.

Hence, a sound motion picture projector is described having no additional moving components for automatically threading sound film through the system as well as automatically obtaining image frame-to-sound synchronization.

What is claimed is:

1. In a motion picture projector having a projection station, a sound station, a fixed film guide surface for guiding film along a film path connecting the projection station and the sound station, a leading sprocket for feeding film along the film path to said projection station, and a trailing sprocket for feeding film from said sound station, a sound and image synchronization system comprising:
    a film threading path defining block fixed intermediate said projection station and said sound station relative to said fixed film guide surface to define a fixed threading path for guiding film from said projection station toward said sound station during film threading and film projection;
    a throat recess formed in the surface of said block opposite said fixed film guide surface past which said film is move for threading and relative to which said film pulses during transport to and through said sound station toward said trailing sprocket; and
    a pulsation smoothing portion formed on said surface of said block proximate said throat recess in the direction in which said film is moved along said block during threading and against which said film is moved to isolate intermittent film movement as said film is transported from said projection station toward said sound station during projection.

2. A sound and image synchronization system for a motion picture projector as in claim 1 wherein said film path between said projection station and said gate is configured to accept during threading a length of film equal to frame-to-sound linear separation along said film whereby said image and sound are synchronized during film projection.

3. A sound and image synchronization system for a motion picture projector as in claim 1 wherein said projector includes a loop former and the said sound station includes a relatively movable transducer and pressure pad defining a gate, and said system comprises;
    gate control means coupled to said loop former for opening and closing said gate in synchronism with positioning of said loop former, said gate control means opening said sound station gate for unrestrained movement of film therethrough during a film threading sequence and for closing said gate during a projection sequence to restrain film movement through said gate to form a pulsating loop in said throat recess and over said pulsating said smoothing portion to isolate intermittent film movement through said projection station from constant film movement through said sound station.

* * * * *

UNITED STATES PATENT OFFICE
CERTIFICATE OF CORRECTION

PATENT NO. : 4,009,949
DATED : March 1, 1977
INVENTOR(S) : Arthur E. Nupnau

It is certified that error appears in the above-identified patent and that said Letters Patent are hereby corrected as shown below:

Column 1, line 43, after "sound" insert --and--.

Column 2, line 33, change "the" (first occurrence) to --they--.

Column 3, line 48, change "rotatings cause" to --rotating, causes--.

Signed and Sealed this

*twenty-sixth* Day of *July 1977*

[SEAL]

*Attest:*

RUTH C. MASON
*Attesting Officer*

C. MARSHALL DANN
*Commissioner of Patents and Trademarks*